(12) United States Patent
Touraud et al.

(10) Patent No.: US 9,732,222 B2
(45) Date of Patent: Aug. 15, 2017

(54) MODIFIED POLYAMIDE COMPOSITION

(75) Inventors: Franck Touraud, Eyzin Pinet (FR); Stéphane Jeol, Lyons (FR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 13/382,032

(22) PCT Filed: Jun. 24, 2010

(86) PCT No.: PCT/EP2010/058975
§ 371 (c)(1),
(2), (4) Date: Jan. 20, 2012

(87) PCT Pub. No.: WO2011/000763
PCT Pub. Date: Jan. 6, 2011

(65) Prior Publication Data
US 2012/0172521 A1 Jul. 5, 2012

(30) Foreign Application Priority Data
Jul. 3, 2009 (FR) ...................................... 09 54564

(51) Int. Cl.
*C08L 77/06* (2006.01)
*C08G 69/26* (2006.01)
*C08G 69/42* (2006.01)
*C08G 69/48* (2006.01)

(52) U.S. Cl.
CPC ............ *C08L 77/06* (2013.01); *C08G 69/265* (2013.01); *C08G 69/42* (2013.01); *C08G 69/48* (2013.01)

(58) Field of Classification Search
CPC ....... C08L 77/06; C08G 69/265; C08G 69/42; C08G 69/48
USPC ........................................................ 524/602
See application file for complete search history.

(56) References Cited

U.S. PATENT DOCUMENTS

| | | | |
|---|---|---|---|
| 3,846,507 A | 11/1974 | Thomm et al. | |
| 3,957,734 A | 5/1976 | Radlmann et al. | |
| 4,882,222 A * | 11/1989 | Talley et al. | 428/362 |
| 5,236,645 A * | 8/1993 | Jones | 264/78 |
| 5,959,069 A | 9/1999 | Glück et al. | |
| 6,037,421 A | 3/2000 | Asrar | |
| 6,525,166 B1 | 2/2003 | Di Silvestro et al. | |
| 2008/0064826 A1* | 3/2008 | Shinohara | 525/420 |

FOREIGN PATENT DOCUMENTS

| | | |
|---|---|---|
| CA | 990 894 A1 | 6/1976 |
| EP | 0 682 057 A1 | 11/1995 |
| EP | 0 632 703 B1 | 2/1999 |
| EP | 0 832 149 B1 | 7/2000 |
| FR | 2 743 077 A1 | 7/1997 |
| FR | 2 779 730 A1 | 12/1999 |
| WO | WO 99/03909 A1 | 1/1999 |

OTHER PUBLICATIONS

El-Garf et al. Modifying Nylon 6 by Treating with Dichlorobenzenesulfonyl Chloride. Textile Research Journal. vol. 1, No. 1. Jan. 1997.*
International Search Report (PCT/ISA/210) issued on Jul. 22, 2010, by European Patent Office as the International Searching Authority for International Application No. PCT/EP2010/058975.
Choi, J., et al., "Nafion-Sulfonated Poly(arylene ether sulfone) Composite Membrane for Direct Methanol Fuel Cell," Macromolecular Research, 2005, vol. 13, No. 6, pp. 514-520.

* cited by examiner

*Primary Examiner* — John Uselding
(74) *Attorney, Agent, or Firm* — Dentons US LLP

(57) ABSTRACT

A sulfonated aliphatic or aromatic compound for the production of a modified polyamide that can significantly increase the glass transition temperature of the polyamide is described. A polyamide composition including at least: one polyamide modified by a sulfonated compound, the compound being chemically bonded to the polymer chain of the polyamide; and reinforcing or filling agents is also described. The composition can be a composition to be molded, for example, in the form of granules or powder, to be used in the production of articles using an injection molding method.

19 Claims, No Drawings

MODIFIED POLYAMIDE COMPOSITION

This application claims priority under 35 U.S.C. §119 of FR 0954564, filed Jul. 3, 2009, and is the United States national phase of PCT/EP2010/058975, filed Jun. 24, 2010, and designating the United States (published in the French language on Jan. 6, 2011, as WO 2011/000763 A1; the title and abstract were also published in English), each hereby expressly incorporated by reference in its entirety and each assigned to the assignee hereof.

The present invention relates to the use of a sulfonated aliphatic or aromatic compound for the production of a modified polyamide that can significantly increase the glass transition temperature of said polyamide. The invention also relates to a polyamide composition comprising at least: one polyamide modified by a sulfonated compound, said compound being chemically bonded to the polymer chain of the polyamide, and reinforcing or filling agents. The composition is preferably a composition to be molded, for example in the form of granules or powder, to be used in the production of articles by an injection-molding method.

Industrial polyamides are used for the production of many articles in different fields, such as the automobile field, where specific properties of rigidity, impact resistance, dimensional stability, in particular at relatively high temperature, surface appearance, density and weight are particularly in demand. The choice of a material for a given application is generally guided by the level of performance required with regard to certain properties and by its cost. There is in fact always a search for new materials able to meet a specification in terms of performance and/or costs.

It appears that polyamide displays a rather low glass transition temperature in the region of 60° C. for polyamide 66, in comparison to other plastics such as PET or PVC. Above the Tg, the secondary non-covalent bonds between the chains of polyamides become weak in comparison to thermal vibration and the polyamide becomes flexible and capable of deforming elastically or plastically without fracture. The only cohesion of the material is then provided by the crystalline zones. This behavior is one of the properties which render the majority of polyamides so useful in diverse technical fields.

There is thus a real need to increase the Tg of a polyamide in order to increase the utilization temperature range of said polyamide in its glassy and elastic state, below this glass transition temperature, in particular in order to maintain a high elastic modulus.

The modification of the Tg of a polyamide in various ways is known, in particular by using aromatic comonomers during the production of the polyamide. However, to obtain a significant increase in the Tg it is necessary to add a substantial quantity thereof, which leads to amorphization of the matrix, a drastic loss in mechanical properties and rheological problems and problems in shaping the formulations.

There is thus a need to obtain industrial polyamide compositions for various applications having the best possible mechanical properties by increasing the Tg while avoiding the aforesaid disadvantages.

The applicant has just altogether surprisingly discovered that the use of a sulfonated aliphatic or aromatic compound for the production of a modified polyamide made it possible to increase the glass transition temperature of said polyamide significantly. This effect is obtained without drastically modifying the amorphous and crystalline phase equilibrium of the polyamide and thus without diminishing the plastic and mechanical properties of the polyamide. Said sulfonated aliphatic or aromatic compound thus acts as an agent increasing the glass transition temperature of a polyamide.

The invention thus relates to the use of a sulfonated compound for the production of a modified polyamide displaying an increased glass transition temperature.

The present invention thus relates to a polyamide composition comprising at least:
one polyamide modified by a sulfonated compound, said compound being chemically bonded to the polymer chain of the polyamide;
from 1 to 60% by weight of reinforcing or filling agents; and
possibly additives normally used in the field.

The percentage by weight is expressed relative to the total weight of the polyamide composition.

The composition is preferably a molding composition, for example in the form of granules or powder, to be used in the production of articles by an injection molding method.

"Sulfonated compound" is understood to mean an aromatic or aliphatic organic compound containing at least one $SO_3X$ functional group. $SO_3X$ represents $SO_3H$ or $SO_3M$; M being a group which replaces the $SO_3H$ proton to form an inactive salified group. M can in particular be selected from the elements of the periodic table such as the alkali metals, including in particular Li, Na, K or Cs, the alkaline earth metals, including in particular Ca, Mg or Ba, the transition metals, including in particular Ti, Zr, Cr, Mn, Fe, Co, Ni, Cu, Zn or Ag, the poor metals, including in particular Al, Pb, Sn or Ga, the metalloids, including in particular Sb, Ge or Si, the rare earths or any other type of cation such as ammonium $NH_4^+$, etc. ...

"Inactive" salified group is understood to mean in particular a salified group which does not react with amine functional groups or acid functional groups, in particular with the amine and acid functional groups of the monomers from which the polyamide of the invention is derived.

M is preferably an alkali metal, preferably sodium or lithium, an alkaline earth metal, preferably calcium or magnesium, or a metal selected from copper, zinc or aluminum.

"Sulfonated aromatic compound" is understood to mean an organic compound containing at least one aromatic ring, such as a benzene for example, said aromatic ring bearing at least one sulfonated functional group $—SO_3X$. The sulfonate functional group preferably being attached to a carbon atom forming part of the aromatic ring.

The sulfonated compound is capable of binding chemically to the polyamide chain in various ways.

The sulfonated compound, once chemically bonded to the polyamide chain, can be considered as an attached sulfonate unit.

For example, it can bind chemically to the polyamide chain so as to form a covalent bond via functional groups capable of reacting with the amine or carboxylic functional groups of the monomers of the polyamide such as the amine, carboxylic acid, aldehyde, anhydride, hydroxyl or ketone functional groups or derivatives thereof. These functional groups may or may not be borne by the aromatic structure of the compound.

This covalent bond is preferably a bond of the amide type but can also be an imine functional group when the reactive functional group or functional groups of the sulfonated aromatic compound is an aldehyde or a ketone, an imide functional group when the reactive functional group or functional groups of the sulfonated aromatic compound is an anhydride or a vicinal diacid, an ester functional group when the reactive functional group or functional groups of the sulfonated aromatic compound is a hydroxyl, etc. . . . .

Moreover, the sulfonate groups are capable of interacting via non-covalent but high energy bonds (H and/or ionic and/or metal complexation bonds in particular) with one or more components of the polyamide such as residual amine and acid functional groups at the ends of chains, central amide functional groups, other sulfonate groups or also with other components present in the polyamide (hetero atoms such as for example hydroxyl, ether, secondary or tertiary amine functional groups, . . . ).

Depending on the number of its functional groups capable of reacting with the amide or carboxylic acid functional groups of the polyamide, the compound of the invention can be located in the polymer chain of the polyamide or else at the polymer chain end.

The sulfonated compound preferably bears either one or more primary amine functional groups and/or one or more carboxylic acid functional groups or derivatives, such as acid chloride, ester or anhydride.

The sulfonated compound of the invention, which will be chemically bonded to the polymer chain of the polyamide, can in particular be represented by the general formula (I):

$$(Z)_n\text{—}Y\text{—}(SO_3X)_m \quad (I)$$

wherein:
SO$_3$X represents SO$_3$H or SO$_3$M; M being a group which replaces the proton SO$_3$H to form an inactive salified group;
m lies between 1 and 10 and preferably equals 1, 2 or 3.
Y is a linear or cyclic, aromatic or aliphatic hydrocarbon radical containing from 2 to 100 carbon atoms, and capable of containing hetero atoms.
Z is a functional group capable of reacting with the amine or carboxylic acid functional groups of the monomers of the polyamide.
n lies between 1 and 10 and preferably equals 1, 2 or 3.

Mixtures of compounds of formula (I) can in particular be used for the production of a modified polyamide.

Y preferably contains from 1 to 24 carbon atoms. Y is preferably a multivalent aromatic hydrocarbon radical. More preferably, Y is a radical capable in particular of containing from 6 to 18 carbon atoms. The radical Y can possibly be substituted, in particular of an arylaliphatic nature. The radical Y is preferably a benzene or naphthalene radical optionally substituted by alkyl groups, and also capable of containing hetero atoms such as oxygen or sulfur.

Z is preferably selected from —COHal (Hal signifies halogen), —COOR, —COONRR', —CO—R, —NH$_2$, R and R', the same or different, being a hydrogen atom or a linear or branched alkyl radical, preferably containing from 1 to 18 carbon atoms, more preferably from 1 to 4 carbon atoms.

The compound of formula (I) is in particular selected from the group comprising: sodium 5-sulfoisophthalic acid, lithium 5-sulfoisophthalic acid, sodium-4-carboxybenzene sulfonate, sodium-3-carboxybenzene sulfonate, sodium-2-carboxybenzene sulfonate, lithium-3-carboxybenzene sulfonate, potassium-3-carboxybenzene sulfonate, sodium-3-carbomethoxybenzene sulfonate, potassium-2-carbopropoxybenzene sulfonate, sodium-2-carbomethoxyethylbenzene sulfonate, potassium-3-aminomethylbenzene sulfonate, sodium-2-aminoethylbenzene sulfonate and potassium-3-aminopropylbenzene sulfonate.

The modified polyamide according to the invention generally contains from 0.1 to 70 mol % of sulfonate unit relative to the total number of moles of units constituting the polymer chain, in particular of diacid or diamine units and/or of amino acid units in the polymer chain, preferably from 1 to 50%, more preferably from 5% to 30%. Mole of diacid unit or mole of diamine unit in the case of the utilization of a diacid/diamine mixture is understood to mean one mole of diacid and one mole of diamine utilized for preparing the polyamide, in other words is understood to mean one mole of the diacid/diamine salt utilized for the preparation of the polyamide. Mole of aminocarboxylic acid unit is understood to mean one mole of amino acid or one mole of lactam utilized for preparing the polyamide. In the case of the utilization of a diamine/diacid mixture, if one of the two monomers (diacid or diamine) is used in excess relative to the other, the calculation of the molar proportion of unit containing a sulfonate group is performed relative to the number of moles of units derived from the monomer present in excess.

According to the present invention, the modified polyamide containing a sulfonated compound chemically bonded to the polymer chain of the polyamide can be obtained in various ways.

It can be produced by addition of the sulfonated compound in polymerization of the polyamide in the melted state, that is to say in the liquid state, in the presence of the monomers of the polyamides. The sulfonated compound can also be added hot-mixed with the formed or partially formed polyamide, for example in the extruder. The sulfonated compound can also be added in the solid phase, in particular during a post-condensation. For certain polyamides, it is also possible to effect the addition of the sulfonated compound during solution polymerization.

The production of the modified polyamide of the invention by polymerization in the melted state, that is to say in the liquid state, is particularly preferred. The polymerization medium can for example be an aqueous solution containing the monomers, or a liquid containing the monomers, in particular water. The modified polyamide of the invention is generally obtained by polycondensation between the monomers of the polyamide and the sulfonated aromatic compound, to form polyamide chains, with formation of the elimination product, in particular water, part of which may vaporize. The sulfonated compound can be added at the start, in the middle or at the end of polymerization of the polyamide, and in the presence or absence of a quantity of diamine or diacid to ensure perfect stoichiometry of the reactive functional groups. This adjustment of the stoichiometry makes it possible to modulate the size of the chain of the modified polyamide.

The modified polyamide of the invention is generally obtained by heating at high temperature and pressure, for example of an aqueous solution containing the monomers, or of a liquid containing the monomers, to evaporate the elimination product, in particular the water initially present in the polymerization medium and/or formed during the polycondensation while avoiding any formation of solid phase in order to avoid solidification. The polycondensation is generally conducted in the melted phase at atmospheric or reduced pressure so as to achieve the desired progression level.

The polycondensation product can also undergo a post-condensation stage in the solid phase. This stage is known to those skilled in the art and makes it possible to increase the degree of polycondensation to a desired value.

A chain limiter can also be used to modulate the size of the chain of the modified polyamide. This chain limiter can bear functional groups which are not chemically reactive with the polyamide. Non-limiting examples of chain limiters are acetic acid and benzoic acid.

The conditions of the process of the invention are similar to the normal process for preparation of semi-crystalline or amorphous polyamides or copolyamides, such as the aliphatic polyamides, semi-aromatic polyamides and more generally the linear polyamides obtained by polycondensation between an aliphatic or aromatic diacid, and an aromatic or aliphatic primary diamine, the polyamides obtained by condensation of a lactam, an amino acid or the linear polyamides obtained by condensation of a mixture of these different monomers.

The modified polyamide according to the invention can in particular contain at least one unit containing a sulfonate group of the following formula (II):

$$-L-Y-(SO_3X)_m \qquad (II)$$

wherein:
- -L is a radical derived from the condensation of two reactive functional groups wherein one of the reactive functional groups is Z; and
- Y, X, Z and m are defined above.

In the sense of the invention, polyamide is understood to mean a polymer comprising at least 51 mol % of diamine or diacid monomers or amino acids or lactams and resulting from the polymerization reaction of acid and amine functional groups forming said amide functional groups. The polyamide can also contain other functional groups such as ester and/or ether functional groups, for example.

More precisely, these copolyamides can be, for example, hexamethylene polyadipamide, polyphthalamides obtained from terephthalic and/or isophthalic acid, or copolyamides obtained from adipic acid, hexamethylene diamine and caprolactam.

According to a preferred embodiment of the invention, the modified polyamide is a polyamide of the polyamide 6, polyamide 66, polyamide 10, polyamide 11, polyamide 12, polymetaxylylene diamine (MXD6) or polyamide 66/6T type, or mixtures and copolymers based on these polyamides.

The polyamide is preferably selected from the group comprising the polyamides obtained by polycondensation of at least one linear dicarboxylic acid with a linear or cyclic diamine such as PA 6.6, PA 6.10, PA 6.12, PA 12.12, PA 4.6, MXD 6 or between at least one aromatic dicarboxylic acid and one linear or aromatic diamine such as the polyterephthalamides, polyisophthalamides, polyaramides, the polyamides obtained by polycondensation of at least one amino acid with itself, the amino acid being capable of generation by hydrolytic opening of a lactam ring such as for example PA 6, PA 7, PA 11 or PA 12.

The composition of the invention can also contain the copolyamides derived in particular from the polyamides above, or the mixtures of these polyamides or copolyamides.

The preferred polyamides are polyhexamethylene adipamide, polycaprolactam, or copolymers and mixtures between polyhexamethylene adipamide and polycaprolactam.

Polyamides of molecular weights suitable for injection molding processes are generally used, although polyamides with lower viscosities may also be used.

The modified polyamide can in particular be a polymer containing star or H, branched, ramified or hyper-ramified macromolecular chains, and if necessary linear macromolecular chains. Polymers containing such star or H macromolecular chains are for example described in the documents FR2743077, FR2779730, U.S. Pat. No. 5,959,069, EP0632703, EP0682057 and EP0832149.

The modified polyamide can be a polymer of the random tree type, preferably a copolyamide having a random tree structure. These copolyamides of random tree structure and the process for obtention thereof are in particular described in the document WO99/03909. The matrix of the invention can also be a composition containing a linear thermoplastic polymer and a star, H and/or tree thermoplastic polymer such as is described above. The matrix of the invention can also contain a hyperbranched copolyamide of the type described in the document WO 00/68298. The composition of the invention can also contain any combination of linear, star, H, tree or hyperbranched copolyamide thermoplastic polymers such as is described above.

The composition according to the invention preferably contains from 30 to 95% by weight of polyamide, preferably from 40 to 80% by weight, relative to the total weight of the composition.

The composition can also contain, depending on the final property desired, a mixture of modified polyamide according to the invention and one or more other polymers, such as for example polyamide, polyester, polyolefins, polystyrene, ABS resin, polycarbonate, polyphenylene sulfide, polyphenylene oxide, polyacetal, polysulfone, polyether sulfone, polyether imide, polyether ketone, a polylactic acid resin, a polysulfone resin, an elastomer resin or mixtures of these.

The reinforcing or filling agents according to the present invention can for example be fibrous agents and/or non-fibrous agents.

As fibrous agents, glass fibers, carbon fibers, natural fibers, aramid fibers and nanotubes, in particular of carbon, can be mentioned. As natural fibers, hemp and flax can be mentioned. Among the non-fibrous agents, all particulate or lamellar agents and/or exfoliable or non-exfoliable nano-agents such as alumina, carbon black, alumino-silicate clays, montmorillonites, zirconium phosphate, kaolin, calcium carbonate, diatoms, graphite, mica, silica, titanium dioxide, zeolites, talc, wollastonite, polymeric agents such as for example particles of dimethacrylates, glass beads or glass powder can in particular be mentioned.

It is perfectly possible according to the invention that the composition contain several types of reinforcing agent. Preferably, the agent most used can be glass fibers, of the type referred to as cut (chopped), in particular having a diameter lying between 7 and 14 μm. These agents can have surface greasing which provides mechanical adhesion between the fibers and the polyamide matrix.

The concentration by weight of the reinforcing or filling agents advantageously lies between 1% and 60% by weight relative to the total weight of the composition, preferably between 15 and 50%.

The composition according to the invention can further contain additives normally used for the production of polyamide compositions. Thus lubricants, fire retardants, plasticizers, nucleating agents, impact modifiers, catalysts, light and/or heat stabilizers, antioxidants, antistatic agents, colorants, matting agents, molding aid additives or other conventional additives can be mentioned.

Agents modifying the impact resistance can in particular be added to the polyamide composition. It is generally polymers of elastomers which can be used for this purpose. Impact strength modifiers are generally defined as having an ASTM D-638 tensile modulus less than about 500 MPa. Examples of suitable elastomers are ethylene-acrylic ester-maleic anhydride, ethylene-propylene-maleic anhydride, and EPDM (ethylene-propylene-monomeric diene) possibly with a grafted maleic anhydride. The concentration by weight of elastomer advantageously lies between 0.1 and 30% relative to the total weight of the composition.

Impact modifiers containing functional groups reactive towards the polyamide are particularly preferred. Terpolymers of ethylene, acrylate ester and glycidyl methacrylate, copolymers of ethylene and acrylate butyl ester, copolymers of ethylene, n-butyl acrylate and glycidyl methacrylate, copolymers of ethylene and maleic anhydride, styrene-maleimide copolymers grafted with maleic anhydride, styrene-ethylene-butylene-styrene copolymers modified with maleic anhydride, maleic anhydride-grafted styrene-acrylonitrile copolymer, maleic anhydride-grafted acrylonitrile butadiene styrene copolymers, and hydrogenated versions thereof can for example be mentioned. The proportion by weight of these agents in the total composition in particular lies between 0.1 and 40%.

These agents and additives can be added to the modified polyamide by normal methods suitable for each agent or additive, such as for example during the polymerization or during melt mixing.

The materials and compositions of the invention are generally obtained by mixing the different constituents hot, for example in a single or twin screw extruder, at a temperature sufficient to maintain the polyamide resin as a melted medium; or cold in a mechanical mixer in particular. Generally, the mixture obtained is extruded in the form of rods which are cut into pieces to form granules. The compounds can be added at any moment in the process of production of the plastic material, in particular by hot or cold mixing with the plastic matrix. The addition of the compounds and additives, such as novolac resin, can be effected by addition of these compounds to the melted plastic matrix in the pure form or the form of a concentrated mixture in a matrix such as for example a plastic matrix.

The composition according to the invention can be used for any process of shaping of plastic materials, such as for example the processes of molding, in particular injection molding or extrusion such as blow-molding extrusion.

The present invention thus also relates to a process for injection molding wherein a composition according to the invention, in particular in the form of granules, is introduced into an injection molding device and the molding is performed.

The use of the compositions according to the invention is particularly interesting in the context of the production of articles for the automobile or electrical industry.

Specific language is used in the description so as to facilitate understanding of the principle of the invention. It must nonetheless be understood that no limitation of the scope of the invention is envisaged by the use of this specific language. In particular, modifications, improvements and refinements can be envisaged by those skilled in the technical field concerned on the basis of their own general knowledge.

The term and/or includes the meanings and, or, and all the other possible combinations of the elements connected by this term.

Other details or advantages of the invention will appear more clearly on inspection of the examples given below purely by way of illustration.

EXPERIMENTAL SECTION

Definitions

Contents of terminal acid (GTC) and amine (GTA) groups: assayed by potentiometry, expressed in meq/kg.

When the sulfonated compound is a monofunctional monosulfonate, the content of terminal sulfonate groups (GTS) can be calculated from the quantities of reagents introduced into the polymerization reactor.

Number average molecular weight Mn determined by the formula $Mn=2.10^6/(GTA+GTC+GTS)$ and expressed in g/mol.

When the sulfonated compound is a monofunctional monosulfonate, the chain end sulfonate number per chain can be calculated in the following manner: Nsulfonate/chain=GTS/((GTA+GTC+GTS)/2).

Melting point ($T_f$) and associated enthalpy ($\Delta Hf$), crystallization temperature on cooling ($T_c$): determined by differential scanning calorimetry (DSC) by means of a Perkin Elmer Pyris 1 instrument, at a speed of 10° C./min. The degree of crystallinity is obtained by the calculation $\chi c=\Delta Hf/\Delta Hf°$, with $\Delta Hf°$ the enthalpy of fusion of a pure crystal of polyamide ($\Delta Hf°(PA66)=188$ J/g). Glass transition temperature ($T_g$) determined on the same instrument at a speed of 40° C./min.

Comparative Example 1

Non-modified PA 66

Into a polymerization reactor are introduced 92.6 kg (353 mol) of N salt (1:1 salt of hexamethylene diamine and adipic acid), 84 kg of demineralized water and 6.4 g of Silcolapse 5020® antifoaming agent. The polyamide 66 is produced by a standard polymerization method of the polyamide 66 type, with 30 minutes of finishing. The polymer obtained is cast in rod form, cooled and made into granule form by chopping the rods.

The polymer obtained displays the following characteristics: GTC=70.2 meq/kg, GTA=51.5 meq/kg, Mn=16430 g/mol.

The polyamide 66 is semi-crystalline and has the following thermal characteristics: Tg=70.6° C., Tc=230.9° C., Tf=263.7° C., $\Delta Hf=68.4$ J/g thus $\chi c=36.4\%$.

Comparative Example 2

Preparation of a PA 66/6I 80/20 Copolyamide

Into a polymerization reactor are introduced 117.92 g (0.450 mol) of N salt (1:1 salt of hexamethylene diamine and adipic acid), 31.73 g of 6I salt (1:1 salt of hexamethylene diamine and isophthalic acid) (0.112 mol), 1.05 g of a solution of hexamethylene diamine (HMD) in 32.5% by weight solution in water (0.003 mol) and 135.74 g of demineralized water and 2 g of an aqueous solution of antifoaming agent. The polyamide 66/6I 80/20 is produced by a standard polymerization method of the polyamide 66 type, with 45 minutes of finishing at atmospheric pressure. The polymer obtained is cast in rod form, cooled and made into granule form by chopping the rods.

The polymer obtained displays the following characteristics: GTC=86.1 meq/kg, GTA=59.1 meq/kg, Mn=13800 g/mol.

The polyamide 66/6I 80/20 is semi-crystalline and has the following thermal characteristics: Tg=77.9° C., Tc=194.4° C., Tf=239.6° C., $\Delta Hf=42.6$ J/g thus $\chi c=22.7\%$. The introduction of the aromatic ring of the isophthalic acid induces a slight increase in the Tg of PA 66 (+7° C.) for a decrease in the degree of crystallinity of 38% compared to the PA 66.

Example 3

Preparation of a Polyamide 66 Containing about 5 mol.-% of SBA

Into a polymerization reactor are introduced 87.2 kg (332.5 mol) of N salt (1:1 salt of hexamethylene diamine and adipic acid), 4057 g of 96.7% sodium 3-carboxy-benzenesulfonate (SBA) (17.5 mol), 3398 g of a solution of hexamethylene diamine (HMD) in 32.48% by weight solution in water (9.5 mol) and 83 kg of demineralized water and 6.4 g of Silcolapse 5020® antifoaming agent. The molar content of sulfonate compound equals 17.5/(332.5+17.5+9.5)=4.9 mol.-%. The polyamide 66 containing 4.8 mol.-% of SBA is produced by a standard polymerization method of the polyamide 66 type, with 40 minutes of finishing under a vacuum of 70 mbar. The polymer obtained is cast in rod form, cooled and made into granule form by chopping the rods.

The polymer obtained displays the following characteristics: GTC=51.1 meq/kg, GTA=44.1 meq/kg, GTS=219 meq/kg, Mn=$2.10^6$/(GTA+GTC+GTS)=6,370 g/mol. There are on average 1.4 sulfonate ends per chain.

The polyamide obtained is semi-crystalline and has the following thermal characteristics: Tg=86.5° C., Tc=228.2° C., Tf=259.5° C., ΔHf=71.2 J/g, χc=37.9%. The sulfonate-terminated polyamide, in spite of a lower molar mass, has a Tg considerably higher by about 16° C. compared to that of PA 66 and a comparable degree of crystallinity.

Example 4

Preparation of a Polyamide 66 Containing about 10 mol.-% of SBA

Into a polymerization reactor are introduced 132.77 g (0.506 mol) of N salt (1:1 salt of hexamethylene diamine and adipic acid), 12.73 g of 99% sodium 3-carboxybenzenesulfonate (SBA) (0.056 mol), 12.20 g of a solution of hexamethylene diamine (HMD) in 32.25% by weight solution in water (0.034 mol) and 127 g of demineralized water and 2 g of antifoaming agent. The molar content of sulfonate compound equals 0.056/(0.506+0.056+0.034)=9.4 mol.-%. The polyamide 66 containing 9.3 mol.-% of SBA is produced by a standard polymerization method of the polyamide 66 type, with 30 minutes of finishing under a vacuum of about 10 mbar. The polymer obtained is cast on a tray.

The polymer obtained displays the following characteristics: GTC=108.7 meq/kg, GTA=98.3 meq/kg, GTS=435 meq/kg, Mn=3120 g/mol. There are on average 1.36 sulfonate ends per chain.

The polyamide obtained is semi-crystalline and has the following thermal characteristics: Tg=97.8° C., Tc=213.7° C., Tf=251.8° C., ΔHf=63 J/g. The sulfonate-terminated polyamide, in spite of a lower molar mass, has a Tg considerably higher by about 27° C. compared to that of PA 66, and a degree of crystallinity of 33.5%.

Example 5

Preparation of a Polyamide 66 Containing about 18 mol.-% of SBA

Into a polymerization reactor are introduced 116.64 g (0.445 mol) of N salt (1:1 salt of hexamethylene diamine and adipic acid), 25.17 g of 99% sodium 3-carboxybenzenesulfonate or (SBA) (0.111 mol), 20.81 g of a solution of hexamethylene diamine (HMD) in 32.25% by weight solution in water (0.058 mol) and 120.6 g of demineralized water and 2 g of antifoaming agent. The molar content of sulfonate compound equals 0.111/(0.445+0.111+0.058)=18.1 mol.-%. The sulfonate-terminated polyamide is produced by a standard polymerization method of the polyamide 66 type, with 30 minutes of finishing under a vacuum of about 30 mbar. The polymer obtained is cast on a tray.

The polymer obtained displays the following characteristics: GTC=232.4 meq/kg, GTA=203.5 meq/kg, GTS=855 meq/kg, Mn=1550 g/mol. There is on average 1.32 sulfonate ends per chain.

The sulfonate-terminated polyamide is semi-crystalline and has the following thermal characteristics: Tg=105.7° C., Tc=183.2° C., Tf=239.6° C., ΔHf=45 J/g. The sulfonate-terminated polyamide, in spite of a lower molar mass, has a Tg considerably higher by about 35° C. compared to that of PA 66.

Example 6

Preparation of a Polyamide 66 Sulfonate PA 66/6AISLi 95/5

Into a polymerization reactor are introduced 85.9 kg (344.8 mol) of N salt (1:1 salt of hexamethylene diamine and adipic acid), 4657 g of 93.33% lithium salt of 5-sulfoisophthalic acid (AISLi) (17.24 mol), 6435 g of a solution of hexamethylene diamine (HMD) in 32.47% by weight solution in water (17.98 mol) and 81.2 kg of demineralized water and 6.4 g of Silcolapse 5020® antifoaming agent. The polyamide 66 sulfonate is produced by a standard polymerization method of the polyamide 66 type, with 30 minutes of finishing at atmospheric pressure. The polymer obtained is cast in rod form, cooled and made into granule form by chopping the rods.

The polymer obtained displays the following characteristics: GTC=102.6 meq/kg, GTA=94.3 meq/kg, Mn=10160 g/mol.

The polyamide 66 sulfonate PA 66/6AISLi 95/5 is semi-crystalline and has the following thermal characteristics: Tg=92.5° C., Tc=215.4° C., Tf=254.5° C., ΔHf=56.7 J/g thus χc=30.2%. The polyamide sulfonate, in spite of a lower molar mass, has a Tg considerably higher by about 22° C. compared to that of PA 66 while decreasing the degree of crystallinity by only 17%.

Comparison of the experiment with comparative example 2 shows that the sulfonate borne by the aromatic ring is responsible for the large increase in the Tg.

Example 7

Preparation of a Polyamide 66 Sulfonate PA 66/6AISLi 90/10

Into a polymerization reactor are introduced 128.98 g (0.492 mol) of N salt (1:1 salt of hexamethylene diamine and adipic acid), 14.77 g of 93.33% lithium salt of 5-sulfoisophthalic acid (AISLi) (0.0547 mol), 21.2 g of a solution of hexamethylene diamine (HMD) in 32.5% by weight solution in water (0.0593 mol) and 122.73 g of demineralized water and 2 g of an aqueous solution of antifoaming agent. The polyamide sulfonate 66/6AISLi 90/10 is produced by a standard polymerization method of the polyamide 66 type, with 45 minutes of finishing at atmospheric pressure. The polymer obtained is cast in rod form, cooled and made into granule form by chopping the rods.

The polymer obtained displays the following characteristics: GTC=138.7 meq/kg, GTA=114.6 meq/kg, Mn=7900 g/mol.

The polyamide sulfonate 66/6AISLi 90/10 is semi-crystalline and has the following thermal characteristics: Tg=99.5° C., Tc=175.4° C., Tf=242.3° C., ΔHf=41 J/g thus χc=21.8%. The polyamide sulfonate, in spite of a lower molar mass, has a Tg considerably higher by about 29° C. compared to that of PA 66 for a decrease in the degree of crystallinity of the PA 66 by 40%.

Comparison of the experiment with comparative example 2 shows that for a similar reduction in the degree of crystallinity (obtained by taking two times less AISLi than isophthalic acid), the PA sulfonate displays a Tg increased by 29° C. against only 7° C. for the PA 66/6I.

Example 8

Preparation of PA 66/Glass Fiber 70/30 and PA 66 Containing 5 mol.-% of SBA/Glass Fibers 70/30 by Weight Formulations Formulations of polyamide/Vetrotex FV983 glass fibers in a 70/30 ratio by weight are produced in a Leistritz LSM30/34 twin screw extruder (diameter 34 mm, L/D ratio=35) at a screw speed of 250 rpm and with a flow rate of 10 kg/hr (7 kg/hr feed for the polyamide and 3 kg/hr for the glass fiber).

A PA 66/glass fibers 70/30 formulation is produced with extruder heating temperatures lying between 250 and 285° C. A PA 66 5 mol.-% of SBA/glass fibers 70/30 formulation is produced with extruder heating temperatures lying between 220 and 265° C. The rods leaving the extruder are poured into a water cooling tank and then granulated. The granules are then dried under vacuum in a study at 90° C. for 14 hours.

Example 9

Dynamic Thermomechanical Analysis Against Temperature

The batches of formulations produced in example 8 are injected in the form of test pieces of dimensions 80 mm×10 mm×4 mm on an Arburg Allrounder® 350 90, 220 D injection press. The temperature of the mold is regulated at 80° C. For the PA 66/glass fibers 70/30 by weight compound, the temperature of the injection nozzle is 290° C. For the PA 66 5 mol.-% SBA/glass fibers 70/30 compound, the temperature of the injection nozzle is 270° C.

These test pieces are then cut up before being used to compare the thermomechanical properties of the formulations. A TA Instruments RSA3 instrument making it possible to carry out 3 point flexures on the test pieces is used: a sinusoidal stress (frequency 1 Hz and amplitude 0.05%) is applied to the sample and the values of the elastic modulus E' and loss modulus E" are recovered. The measurements are performed following a temperature gradient from −40° C. to 250° C. at a temperature increase speed of 2° C./min.

The results are expressed in the following table 1:

TABLE 1

| Compound | Tα (° C.) | E' 80° C. (GPa) | ΔE' 80° C. |
|---|---|---|---|
| PA 66/glass fiber 70/30 by weight | 74 | 3.08 | — |
| PA 66 5 mol.-% SBA/glass fiber 70/30 by weight | 88 | 3.79 | +23% |

It is observed that the modulus E' of the formulation based on PA containing sulfonate units exhibits a higher modulus at 80° C. than that of the formulation based on PA 66.

The invention claimed is:

1. A method of increasing glass transition temperature of a polyamide composition, the method comprising including an effective amount of a sulfonated aliphatic compound or a sulfonated aromatic compound as an agent to increase the glass transition temperature of the polyamide;
   wherein the polyamide composition comprises a polyamide modified by a sulfonated aliphatic compound or a sulfonated aromatic compound, said compound being chemically bonded to a polymer chain of the polyamide, wherein said modified polyamide is a polycondensate of at least a linear carboxylic diacid and a linear or cyclic diamine, and is present in an amount from 30% to 95% by weight relative to the total weight of the composition, wherein the polyamide is selected from the group consisting of polyamide 66, polyamide 610, polyamide 612, polyamide 1212, polyamide 46, polymethxylylene diamine (MXD6), polyamide 66/6T, mixtures thereof, and copolymers thereof;
   one or more fibrous reinforcing agent, wherein said reinforcing agent is present in an amount from 1% to 60% by weight relative to the total weight of the composition; and
   optionally an additive;
   wherein the sulfonated compound comprises at least one $SO_3X$ functional group, wherein $SO_3X$ represents $SO_3H$ or $SO_3M$; and M is a group which replaces the proton H+ of $SO_3H$ to form an inactive salified group; and
   wherein the polyamide composition is moldable.

2. A polyamide composition comprising a mixture of:
   a polyamide modified by a sulfonated aliphatic compound or a sulfonated aromatic compound, said compound being chemically bonded to a polymer chain of the polyamide, wherein said modified polyamide is a polycondensate of at least a linear carboxylic diacid and a linear or cyclic diamine, and is present in an amount from 30% to 95% by weight relative to the total weight of the composition, wherein the polyamide is selected from the group consisting of polyamide 66, polyamide 610, polyamide 612, polyamide 1212, polyamide 46, polymethxylylene diamine (MXD6), polyamide 66/6T, mixtures thereof, and copolymers thereof;
   one or more fibrous reinforcing agent, wherein said reinforcing agent is present in an amount from 1% to 60% by weight relative to the total weight of the composition; and
   optionally an additive;
   wherein the sulfonated compound comprises at least one $SO_3X$ functional group, wherein $SO_3X$ represents $SO_3H$ or $SO_3M$; and M is a group which replaces the proton H+ of $SO_3H$ to form an inactive salified group; and
   wherein the polyamide composition is moldable.

3. The composition as claimed in claim 2, wherein the sulfonated compound is a sulfonated aromatic compound.

4. The composition as claimed in claim 2, wherein the sulfonated compound is chemically bonded to the polyamide chain to form a covalent bond via at least one functional group capable of reacting with the amine functional group or carboxylic add functional group of at least one monomer of the polyamide.

5. The composition as claimed in claim 4, wherein the sulfonated compound is located in the polymer chain of the polyamide or at the chain end of the polyamide.

6. The composition as claimed in claim 2, wherein the sulfonated compound is represented by the general formula (I):

$(Z)_n$—Y—$(SO_3X)_m$ (I)

wherein
SO₃X represents SO₃H or SO₃M; M is a group which replaces the proton H+ of SO₃H to form an inactive salified group;
m is between 1 and 10;
Y is a linear or cyclic, aromatic or aliphatic hydrocarbon radical containing from 2 to 100 carbon atoms, and capable of containing hetero atoms
Z is a functional group capable of reacting with the amine or carboxylic acid functional groups of the monomers of the polyamide; and
n lies between 1 and 10.

7. The composition as claimed in claim 2, wherein the sulfonated compound is selected from the group consisting of: sodium 5-sulfoisophthalic acid, lithium 5-sulfoisophthalic acid, sodium-4-carboxybenzene sulfonate, sodium-3-carboxybenzene sulfonate, sodium-2-carboxybenzene sulfonate, lithium-3-carboxybenzene sulfonate, potassium-3-carboxybenzene sulfonate, sodium-3-carbomethoxybenzene sulfonate, potassium-2-carbopropoxybenzene sulfonate, sodium-2-carbomethoxyethylbenzene sulfonate, potassium-3-aminomethylbenzene sulfonate, sodium-2-aminoethylbenzene sulfonate and potassium-3-aminopropylbenzene sulfonate.

8. The composition as claimed in claim 2, wherein the modified polyamide comprises from 0.1% to 70 mol % of sulfonate unit relative to the total number of moles of units constituting the polymer chain.

9. The composition as claimed in claim 2, wherein the modified polyamide is obtained by addition of the sulfonated compound in polymerization of the polyamide in the melted state, in the presence of at least one monomers of the polyamide.

10. The composition as claimed in claim 2, wherein the modified polyamide is obtained by addition of the sulfonated compound hot-mixed with a formed polyamide or a partially formed polyamide.

11. The composition as claimed in claim 2, wherein the fibrous reinforcing agentis selected from the group consisting of: glass fibers, carbon fibers, natural fibers, aramid fibers, nanotubes, hemp, and flax.

12. The composition as claimed in claim 2, wherein the additives are selected from the group consisting of: lubricants, fire retardants, plasticizers, nucleating agents, impact modifiers, catalysts, light stabilizers, heat stabilizers, antioxidants, antistatic agents, colorants, matting agents, and molding aid additives.

13. An article obtained by shaping of a composition as claimed in claim 2 by a process of molding or extrusion.

14. The composition as claimed in claim 4, wherein the at least one functional group capable of reacting with the amine or carboxylic acid functional groups is selected from the group consisting of amine, carboxylic acid, aldehyde, anhydride, a hydroxyl, a ketone and derivatives thereof.

15. The composition as claimed in claim 8, wherein the modified polyamide comprises from 0.1 mol % to 70 mol % of sulfonate unit relative to the total number of moles of diacid or diamine and/or amino acid units in the polymer chain.

16. The composition as claimed in claim 2, wherein the polyamide obtained by polycondensation of at least one linear dicarboxylic acid with at least one linear or cyclic diamine is selected from the group consisting of polyamide 66, polyamide 610, polyamide 612, polyamide 1212, polyamide 46, and polymethxylylene diamine (MXD6).

17. The composition as claimed in claim 2, wherein the composition has an increased glass transition temperature relative to a comparable composition not containing the sulfonated aliphatic, compound or the sulfonated aromatic compound.

18. The composition as claimed in claim 2, wherein the composition has an increased elastic modulus relative to a comparable composition not containing the sulfonated aliphatic compound or the sulfonated aromatic compound.

19. The composition as claimed in claim 2, wherein the modified polyamide is present in an amount of from 40% to 80% by weight relative to the total weight of the composition.

* * * * *